Dec. 6, 1955 D. B. HATCHER ET AL 2,726,176
WATERPROOFING POROUS CERAMIC MATERIALS WITH
ETHYLSILOXANOL AND ARTICLE PRODUCED THEREBY
Filed Aug. 7, 1950 2 Sheets-Sheet 1
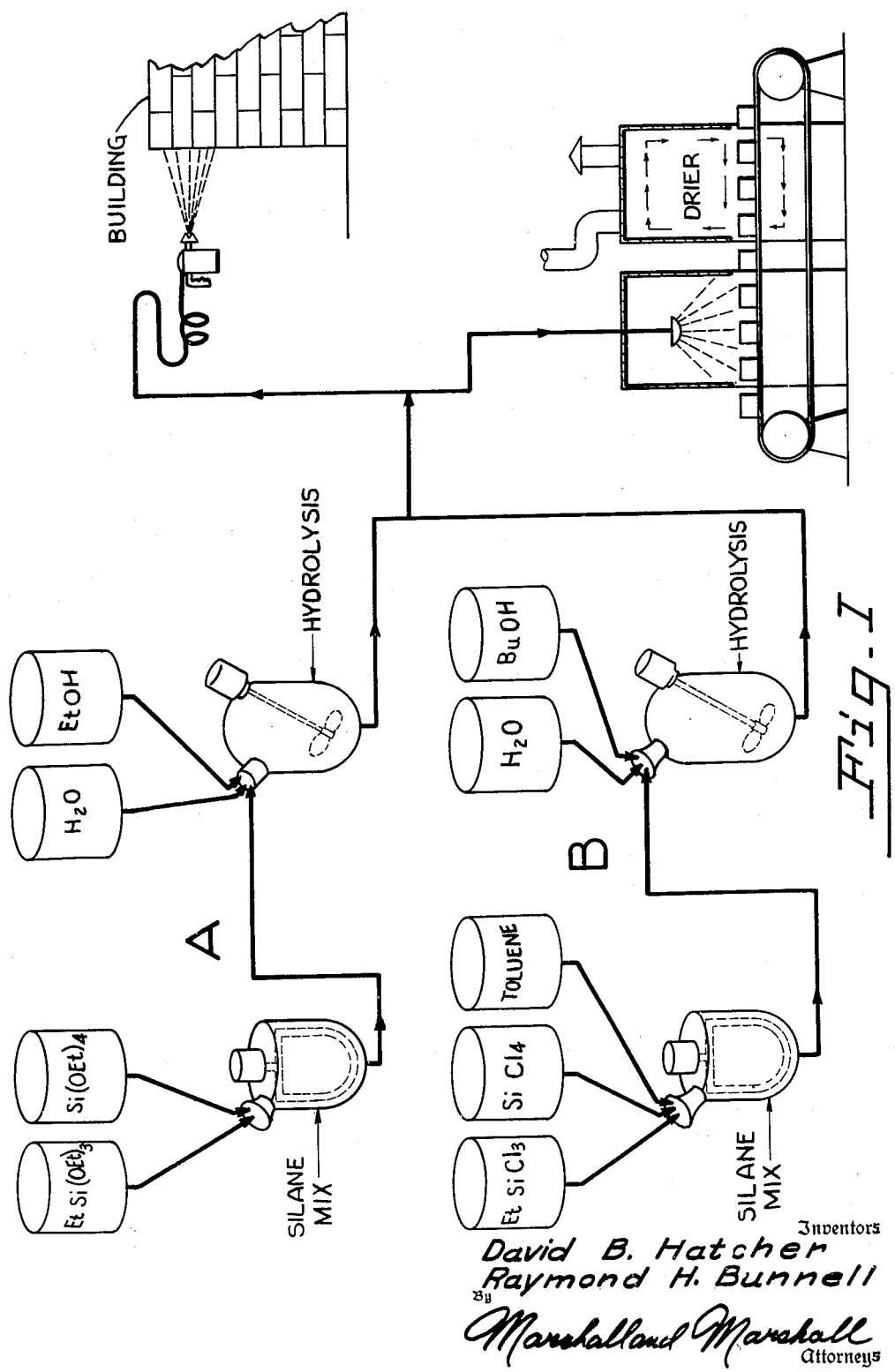
Fig. I
Inventors
David B. Hatcher
Raymond H. Bunnell
By Marshall and Marshall
Attorneys

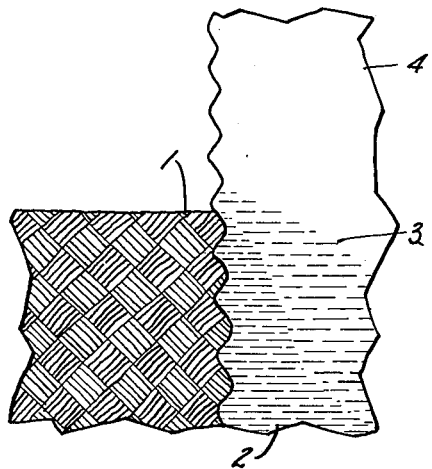
Fig. II
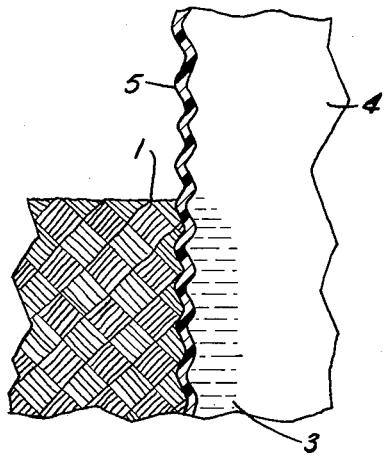
Fig. III
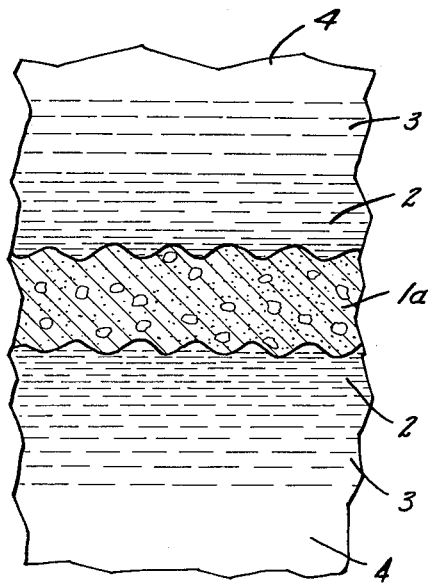
Fig. IV
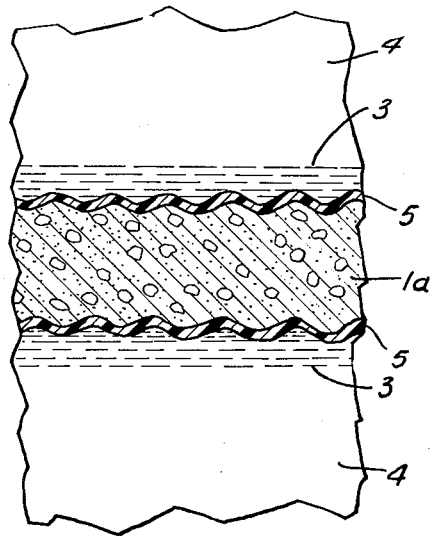
Fig. V
Inventors
David B. Hatcher
Raymond H. Bunnell
By
Marshall and Marshall
Attorneys United States Patent Office 2,726,176
Patented Dec. 6, 1955

2,726,176

WATERPROOFING POROUS CERAMIC MATERIALS WITH ETHYLSILOXANOL AND ARTICLE PRODUCED THEREBY

David B. Hatcher and Raymond H. Bunnell, Toledo, Ohio, assignors, by mesne assignments, to Allied Chemical & Dye Corporation, New York, N. Y., a corporation of New York Application August 7, 1950, Serial No. 178,156

5 Claims. (Cl. 117—123)

The invention relates to an improved method of waterproofing porous ceramic materials such as masonry.

The best method heretofore known for increasing the water resistance of porous ceramic materials has consisted in applying to the surfaces of such ceramic materials a solution of aluminum stearate in a volatile solvent. Such treatment of the surfaces imparts water-repellency, but the water-repellency so imparted disappears after a relatively short period of months or years. Subsequent penetration of water, followed by freezing, then results in gradual weathering and disintegration of the ceramic material.

The principal object of the invention is to improve the waterproofing of porous ceramic material. More specific objects and advantages are apparent from the description, in which reference is had to the accompanying drawings illustrating preferred embodiments of the invention.

Figure I of the drawings is a diagram illustrating preferred methods of practicing the invention.

Figure II is an enlarged fragmentary cross-sectional view of a normal building foundation and moist earth adjacent thereto.

Figure III is a view that is the same as Figure II, except that the foundation has been treated in accordance with the method of the invention.

Figure IV is an enlarged fragmentary cross-sectional view of masonry units held together by mortar as in a normal building structure.

Figure V is a view that is the same as Figure IV, except that the masonry units have been treated in accordance with the method of the invention.

It has been found that a silicate such as ethyl orthosilicate does not give nearly as good results as aluminum stearate in the waterproofing of porous ceramic materials.

United States Patent No. 2,258,220 discloses the production of curable siloxanols by hydrolysis of a mixture of an ethyltrihalosilane and a diethyldihalosilane. The patent describes three experiments, the first of which resulted in a yellow, horny, insoluble and infusible resinous material, the second of which resulted in a brittle solid, and the third of which resulted in a rubbery condensation product. After describing these three experiments, the patent discusses various commercial possibilities. However, it has been found that the cured compositions disclosed in the patent are of no utility because of the severe cracking and crazing that occurs when the compositions are cured in accordance with the disclosure of the patent. The mixture whose hydrolysis is disclosed in the patent contain a diethyldihalosilane which upon hydrolysis tends to form cyclic condensation products. Such cyclic condensation products volatilize when curing is carried out by baking, and the volatilization of cyclic condensation products is believed to be one cause of the severe shrinkage, cracking, and embrittlement that occurs when the compositions are cured in accordance with the disclosure of the patent. Thus, it has not been possible heretofore to prepare any useful product from siloxanols in which the non-hydrolyzable radicals consist of ethyl radicals.

The present invention is based upon the discovery that when a volatile solvent solution of a siloxanol in which the non-hydrolyzable radicals are ethyl radicals, in which the number of ethyl radicals per silicon atom is within a certain critical range, and in which the ethyl radicals are distributed among a certain minimum proportion of the silicon atoms, is applied to a ceramic material and air dried, there is formed a water-repellent coating that is continuous, non-tacky and lasts indefinitely without cracking or crazing. This film, unlike the cured products produced in accordance with Patent No. 2,258,220, is not a completely condensed resin but is a partially condensed silanol, i. e., a siloxanol, that reaches a substantially stable state upon air-drying in that it shows substantially no tendency toward further condensation upon exposure to the atmosphere.

The striking improvement achieved in the waterproofing of porous ceramic materials by the present method has been demonstrated as follows:

Common sand mold bricks, which in the untreated state absorbs a large amount of water, were treated on one flat side and on the four edges with one coat of one of the compositions specified in the first column of the table below. The coating was applied to each brick using a paint brush one and one-half inches wide. After applying the coating to each brick, the brick was permitted to stand for 24 hours, weighed and then placed with the flat, treated side down in a pan containing water at a depth of one-quarter inch. After four hours (practically all water absorption takes place in this time), the bricks were removed from the pans, wiped free of superficial moisture, and weighed. From the increase in weight of each brick, the water absorbed by the brick was calculated as per cent of its former weight. (The terms "per cent" and "parts" are used herein to mean per cent and parts by weight unless otherwise designated.) Five bricks were used to test each composition specified in the table, and the average of the five results is given in the table as the per cent of water absorbed. For the sake of comparison, untreated bricks were tested also in the same manner, the results being included in the table.

The ethylsiloxanol waterproofing solution mentioned in the table was one of the partially condensed ethyl silanol solutions which may be employed in the present method for waterproofing ceramic materials, and was prepared by the following procedure:

A mixture of ethyltrichlorosilane (392.4 grams), silicon tetrachloride (102.0 grams) and toluene (200 ml.) was added dropwise from a dropping funnel to a hydrolyzing solution consisting of water (1650 ml.), 1-butanol (425 ml.) and toluene (200 ml.) contained in a 4-liter beaker surrounded with ice water. The mixture in the beaker was stirred during the addition, and the rate of addition was adjusted so that the temperature of the solution never rose higher than 30 degrees C. When the addition from the dropping funnel, which required approximately one hour, was complete, the resinous layer was separated from the water layer in a separatory funnel, and the water layer was drawn off. The resin was washed with water (3 portions of 150 ml. each) containing enough salt to effect a more rapid separation (i. e., "salting out") of the resinous layer from the aqueous layer. The washed resin was then dried for sixteen hours over anhydrous sodium sulphate (about 35 grams). A commercial filter-aid (10 grams of "Filtercel") was then added and the mixture was filtered. The filtrate was a clear water-white resin solution containing a solids content of 34.62 per cent.

The aluminum stearate solution mentioned in the table comprised approximately 3 per cent of aluminum stearate and 97 per cent of VM and P naphtha.

The silicate paint mentioned in the table is typical of products that have been widely advertised as waterproofing solutions and was prepared by the following procedure:

Ethyl orthosilicate (200 grams), "Shellacol" (73.7 grams of a denatured alcohol consisting of 92.5 per cent of ethanol and 7.5 per cent of water) and dilute hydrochloric acid (30.9 ml. of a solution prepared by diluting 1 part by volume of 37 per cent hydrochloric acid with 6 parts by volume of water) were mixed and allowed to stand at room temperature for 24 hours.

TABLE

| Waterproofing Composition | Percent Water Absorbed |
|---|---|
| Ethylsiloxanol solution | 8.55 |
| Aluminum stearate solution | 14.7 |
| Silicate paint | 19.6 |
| None | 19.5 |

It is readily apparent from the results in the table that the present method of waterproofing porous ceramic materials, which employs a volatile solvent solution of a partially condensed ethylsilanol, as hereinafter defined, is far more effective than the best method for waterproofing ceramic materials heretofore known, which employs an aluminum stearate solution. The ethyl silicone resins used in the present method form a practically continuous flexible film of water repellent properties that prevents the ingress of any appreciable amount of water into stone or brick. The relatively poor waterproofing properties of a solution of aluminum stearate in VM and P naphtha appear to be due to the fact that aluminum stearate, unlike the resins used in the present method, does not effectively penetrate the pores of a ceramic material such as common sand mold brick. Although ordinary rain might run off an aluminum stearate-treated brick, whose surface is water repellent, a wind driven rain soon weathers off the surface coating of aluminum stearate and results in considerable water penetration. (In the above demonstration the one-quarter inch head of water is roughly equivalent to a rain driven by a 20 miles per hour breeze.)

Films of a silicate paint deposited on a brick surface soon condense to a brittle powdery silica with poor adhesion and flexibility. (A film on a glass plate of the silicate paint used in the above demonstration dries rapidly at room temperature to give a highly cracked powdery silica, and the paint solution itself has poor stability. On the other hand, a film on a glass plate of a resin used in the present method (e. g., the ethylsiloxanol used in the above demonstration) dries in one hour to a rather soft, clear, crack-free film, the resin solution having a stability greater than about six months.) As the results in the table indicate, a brick coated with a silicate paint made by hydrolyzing ethyl orthosilicate shows no improvement in water resistance over untreated brick when tested against a one-quarter inch head of water.

Ethylsiloxanol

The present invention consists in a method of waterproofing porous ceramic materials that comprises forming a water-repellent coating thereon by applying a volatile solvent solution of a substance having an average unit structure corresponding to the formula $$(C_2H_5)_m Si(OH)_n O_{\left(\frac{4-(m+n)}{2}\right)}$$

wherein $m$ is a number from 0.3 to 1, not less than 30 percent of the silicon atoms have $C_2H_5$ radicals attached thereto by carbon-silicon bonds, and no substantial number of silicon atoms have more than one such ethyl group attached thereto. Such a substance is referred to herein as an "ethylsiloxanol."

Silane starting materials

The ethylsiloxanols employed in the present method are produced by controlled hydrolysis of a mixture of (1) one or more silanes having the general formula $$(C_2H_5)SiY_3$$

hereinafter referred to as monoethylsilanes, and (2) one or more silanes having the general formula $$SiY_3Y^1$$

hereinafter referred to as tetrafunctional silanes, in which Y is a hydrolyzable radical, and $Y^1$ is a hydrolyzable radical or hydrogen. Minor proportions of other silanes, such as difunctional and monofunctional silanes, and other trifunctional silanes such as methyl, phenyl, methylphenyl, and the like may be present but are not desired for various reasons, among which are (1) they produce volatile products by self-condensation (i. e. difunctional and monofunctional silanes); (2) they hydrolyze and condense so rapidly as to cause gelation of the mixture (i. e. methyl silanes); or (3) they produce siloxanols too brittle for use in this invention (i. e. phenyl silanes). Although one or more monoethyl silanes and one or more tetrafunctional silanes may be employed it is preferred to utilize mixtures in which the hydrolyzable groups are the same or closely similar. Thus ethylsiloxanols for use in the present invention are most desirably prepared by a method that includes either (1) the hydrolysis of a mixture of ethyltriethoxysilane and ethyl orthosilicate as shown in Figure 1 ("A") or (2) the hydrolysis of a mixture of ethyltrichlorosilane and silicon tetrachloride, as shown in Figure 1 ("B"), the molar proportions of the monoethylsilane and tetrafunctional silane being within the ranges hereinbefore described.

"Hydrolyzable radical" is used herein to include halo, alkoxy, amino, aroxy and acyloxy. The halo radical is any one having an atomic weight less than 80 (i. e., fluoro, chloro or bromo). The alkoxy radical is any primary or secondary alkoxy radical having from one to four carbon atoms (i. e., methoxy, ethoxy, propoxy, isopropoxy, n-butoxy, isobutoxy or secondary butoxy). Amino is simply the —NH₂ group. Aroxy radicals are any in which the aryl groups is phenyl, or a mono-, di- or trisubstituted phenyl radical, each substituent being a primary, secondary or tertiary alkyl radical having from one to five carbon atoms, the total number of carbon atoms in the side chains being not more than five (i. e., the aryl radical is phenyl, or ortho-, meta- or para-methyl phenyl, any di- trimethyl phenyl, or any substituted phenyl in which the substituents are: one ethyl; one ethyl and one methyl; two ethyls; two methyls and one ethyl; two ethyls and one methyl; either propyl radical; either propyl radical and methyl; either propyl radical and two methyls; either propyl radical and ethyl; any butyl radical; any butyl radical and methyl; or any pentyl radical). The acyloxy radical has the general formula $$Z-\overset{O}{\underset{\|}{C}}-O-$$

in which Z is a saturated or unsaturated straight, branched or closed chain hydrocarbon radical having from one to eighteen carbon atoms, or phenyl or substituted phenyl, the substituents, if any, consisting of from one to three alkyl radicals each having from one to five carbon atoms, and all having a total of not more than five carbon atoms, as hereinbefore described.

Examples of ethylsilanes that may be used as starting materials for the production of ethylsiloxanols which may be employed in the present method include: ethyltrifluorosilane, diethyldifluorosilane, triethylbromosilane, ethyltrichlorosilane, diethyldichlorosilane, triethylchlorosilane diethyldiethoxysilane, ethyltriethoxysilane, ethyltripropoxysilane, ethyltri-n-butoxysilane and ethyltriisopropyoxysilane.

Examples of tetra-functional silanes that may be used as starting materials in the production of ethylsiloxanols employed in the present method include: ethyl orthosilicate, butyl orthosilicate, propyl orthosilicate, phenyl orthosilicate silicon tetrachloride, silicochloroform, silicon tetrafluoride, and silicon tetra bromide.

Molecular structure of ethylsiloxanol

The average number of hydrolyzable radicals determines, in part, the molecular structure that results after hydrolysis and condensation of silanes. ("Average number of hydrolyzable radicals," as used herein, signifies the total number of hydrolyzable radicals attached to the silicon atoms in the molecules of the silane starting materials divided by the total number of silicon atoms therein.) The reactions which occur during the course of the hydrolysis and condensation of silanes are understood to be represented by Equations 1 and 2 below:

(1) 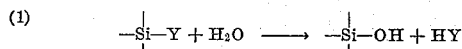

(2) 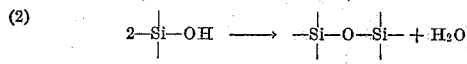

in which Y is a hydrolyzable radical as hereinbefore described. Hydrolysis and condensation of a single silane having, attached to the silicon atoms in the silane molecule, three hydrolyzable radicals yields cross-linked siloxanes; hydrolysis and condensation of a silane having two hydrolyzable radicals yields linear of cyclic siloxanes; while hydrolysis and condensation of a silane having one hydrolyzable radical yields disiloxanes. In general, in a mixture of silanes the average number of hydrolyzable groups attached to the silicon atoms determines the molecular structure of the resulting siloxanes in much the same way. In the practice of the present invention only partial condensation of the products of the hydrolysis of the mixture of silanes is permitted to take place, so that the final hydrolysis products are not siloxanes but are partially condensed silanols (i. e., siloxanols).

The hydrolyzable radicals are removed from the silanes in the first step of hydrolysis so that it does not matter what hydrolyzable radicals are present in the silane starting materials. The significant radical for the purposes of the present invention is —OH, and any radical that is replaced upon hydrolysis by —OH can be used in the practice of the present invention. The least expensive and most readily available hydrolyzable radicals are usually preferred, but the by-product formed in the hydrolysis may also govern the choice of hydrolyzable radicals. For example, since highly toxic methyl alcohol is obtained in the hydrolysis of methoxysilanes, it is usually not desirable to hydrolyze silane mixtures in which the hydrolyzable radicals are methoxy radicals. The most desirable hydrolyzable radicals are ethoxy and chloro radicals.

It is desirable that all hydrolyzable radicals in any one mixture of ethylsilanes and tetra-functional silanes that is used in the production of ethylsiloxanols be the same. Halo radicals are more readily hydrolyzed than amino, acyloxy and alkoxy radicals so that the hydrolysis of, for example, a mixture of an ethyltrihalosilane or an ethyldihaloethoxysilane with ethyl orthosilicate is not as readily controllable as the hydrolysis of, for example, a mixture of an ethyltrihalosilane with silicon tetrachloride or a mixture of ethyltriethoxysilane with ethyl orthosilicate. Ethylsiloxanols that may be used in the practice of the present invention cannot be readily prepared by the hydrolysis (and partial condensation) of a mixture of ethyltriethoxysilane and silicon tetrachloride. The product of such hydrolysis gels since the silicon tetrachloride molecules hydrolyze and condense rapidly with each other before they can co-condense with hydroxy groups derived from the more slowly hydrolyzed ethyltriethoxysilane molecules.

As hereinbefore described the molecular structure of the siloxanols produced depends in part upon the average number of hydrolyzable radicals in the silanes used. This fact may be expressed in another way by saying that the molecular structure of the siloxanols depends upon the average number of non-hydrolyzable radicals attached to the silicon atoms in the silane molecules. The ratio $r/Si$ in which $r$ is the total number of non-hydrolyzable radicals attached to silicon atoms in the molecules of the siloxanols and Si is the total number of silicon atoms therein, represents the average number of non-hydrolyzable radicals. When the ratio of the total number of ethyl radicals to the total number of silicon atoms in the molecular structure of an ethyl siloxanol (i. e., the $r/Si$ ratio or $m$ in the formula given above corresponding to the average unit structure of an ethylsiloxanol) is too low, the siloxanol may not form a continuous flexible film, but may form a film which cracks and becomes powdery. Such a siloxanol is undesirable for use in waterproofing porous ceramic materials. Furthermore, solutions of siloxanols of extremely low $r/Si$ ratio tend to be so unstable as to be commercially unusable. In general, the $r/Si$ ratio of an ethylsiloxanol used in the present method should be at least about 0.3, and it is preferable that it be at least about 0.4. It is more desirable that the $r/Si$ ratio be at least about 0.5. When the $r/Si$ ratio of an ethylsiloxanol is too high, such a siloxanol may not air-dry rapidly enough to be useful in the present method, as is hereinafter discussed. In general the $r/Si$ ratio of an ethylsiloxanol used in the present method should be not greater than about 1, and it is preferable that it be not greater than about 0.9. It is most desirable that the $r/Si$ ratio be not greater than about 0.8.

Not only is the average number of ethyl radicals per silicon atom in the molecular structure of an ethylsiloxanol which may be used in the present invention critical, but the distribution of the ethyl radicals attached to silicon atoms is also important. At least 30 per cent of the silicon atoms in an ethylsiloxanol used in the present method are attached to ethyl radicals. When less than 30 per cent of the silicon atoms in a mixture of an ethylsilane and a tetra-functional silane are attached to ethyl radicals, the product of the hydrolysis of the mixture ordinarily is not a partially condensed silanol but tends to be a gel, even when the hydrolysis is conducted at room temperature. It is preferable that at least 50 per cent of the silicon atoms in the molecules of an ethylsiloxanol used in the present method be attached to ethyl radicals. In any case, as stated hereinabove, it is desirable that no substantial proportion of silicon atoms have more than one ethyl group attached thereto.

Preparation of ethylsiloxanol

In the production of siloxanols for use in the present method it is necessary to hydrolyze a mixture of a monoethylsilane and a tetra-functional silane, for the hydrolysis (and partial condensation) can be easily controlled to obtain siloxanols having any desired $r/Si$ ratio within the limits hereinbefore specified. For example, hydrolysis (and partial condensation) of a mixture of 30 mole per cent of ethyltriethoxysilane with 70 mole per cent of ethyl orthosilicate may be conducted to yield a siloxanol having an $r/Si$ ratio of about 0.3 whereas upon reversal of the molar proportions of silanes in the mixture, a siloxanol having an $r/Si$ ratio of about 0.7 may be obtained. Although monoethylsilanes may comprise from 30 mole per cent to 99 mole per cent of a mixture to be hydrolyzed which contains only tetra-functional silanes in addition to monoethylsilanes (of course, monoethylsilanes may be hydrolyzed alone to produce ethylsiloxanols of an $r/Si$ ratio of 1 which may be used in the present method) usually it is desirable that the monoethylsilanes comprise from 40 to 90 mole per cent of such a mixture, and it is most desirable that they comprise from 50 to 80 mole per cent of the silane mixture. Monoethylsilanes are much less expensive to use than diethyl- and triethylsilanes, whose preparation is more expensive, even though the mole per cent of pure diethyl- or triethylsilane required in the hydrolysis of a mixture of such silane with a tetra-functional silane to obtain a siloxanol having a given r/Si ratio may be proportionately lower than the mole per cent of pure monoethylsilane required to obtain the same r/Si ratio. Since not less than 30 per cent of the silicon atoms in a mixture of ethylsilane and tetra-functional silane to be hydrolyzed must have ethyl radicals attached thereto, a pure diethylsilane cannot be hydrolyzed in admixture with a tetra-functional silane to obtain a siloxanol having an r/Si ratio less than about 0.6, and a pure triethylsilane cannot be hydrolyzed in admixture with a tetra-functional silane to obtain a siloxanol having an r/Si ratio less than about 0.9. Furthermore, siloxanols prepared from mixtures containing diethyl- and triethylsilanes do not air-dry as rapidly as siloxanols produced from mixtures containing only monoethylsilanes in addition to tetra-functional silanes. It is more difficult to control the r/Si ratio of siloxanols prepared from mixtures containing diethyl- and triethylsilanes since some hexaethyldisiloxane (when triethylsilanes are used) and hexaethylcyclotrisiloxane (when diethylsilanes are used) usually tend to form, thus decreasing the yield of the desired ethylsiloxanol.

Hydrolysis

Both methods (1) and (2) are equally suitable for the preparation of ethylsiloxanols having an r/Si ratio of about 0.6 or higher. The hydrolysis of a mixture of ethyltrichlorosilane and silicon tetrachloride is advantageous in that ethyltrichlorosilane is more readily prepared than ethyltriethoxysilane (which is usually prepared by reacting ethyl alcohol with ethyltrichlorosilane). However, a dilute solution of hydrochloric acid is obtained as a by-product from such a hydrolysis reaction, which causes disposal problems as well as loss of hydrogen chloride. On the other hand, although the hydrolysis of a mixture of ethyltriethoxysilane and ethyl orthosilicate involves an extra processing step in the preparation of the ethoxysilane, anhydrous hydrogen chloride may be recovered from the preparation of the ethoxysilane and reused, for example, in the preparation of silicochloroform. Furthermore, ethylsiloxanols for use in the present method of any desired r/Si ratio may be prepared by hydrolysis of a mixture of ethyltriethoxysilane and ethyl orthosilicate, whereas ethylsiloxanols having an r/Si ratio lower than 0.6 cannot be readily prepared by the hydrolysis of a mixture of ethyltrichlorosilane and silicon tetrachloride since silicon tetrachloride hydrolyzes rapidly and gels when the number of hydrolyzable radicals in the mixture to be hydrolyzed is high.

Usually at least partial condensation (i. e., a reaction corresponding to Equation 2, above) accompanies or follows immediately the hydrolysis. However, it is possible to conduct the hydrolysis in such a way that complete condensation does not follow immediately the hydrolysis reaction, so that liquids, hydrolyzed and only partially condensed silanols (i. e., siloxanols) can be isolated after the hydrolysis reaction. In the practice of the invention the extent of the condensation reaction is controlled so that the resulting siloxanol is one having the desired molecular weight and viscosity. In order to be useful in the practice of the present invention, the ethylsiloxanols must be soluble in a volatile solvent, as hereinafter discussed. Thus, the average number of hydroxyl groups per silicon atoms in the molecular structure of an ethylsiloxanol which may be used in the practice of the present invention (i. e., as represented by $n$ in the formula given above which corresponds to the average unit structure of an ethylsiloxanol) must be large enough for the siloxanol to be soluble. However, the resin must be sufficiently condensed so that it has the desired molecular weight and viscosity; i. e., $n$ must not be too large. In general, the ratio between the hydroxy groups and the oxygen atoms attached to silicon atoms is variable, and although the proportion of hydroxyl groups attached to silicon atoms in a freshly prepared solution of an ethylsiloxanol may be relatively high, this proportion tends to decrease gradually upon application of the solution in accordance with the present method.

It is understood, of course, that when a tetrafunctional silane whose molecule contains a hydrogen atom attached to a silicon atom (e. g., silicocholorform) is used in the production of the ethylsiloxanols used in the present method, hydrogen atoms are present in place of some of the hydroxy groups which are represented in formula for the average unit structure of the siloxanols. No difference in the properties of the siloxanols can be detected, however, when hydrogen atoms are present in place of some of the hydroxy groups.

When the hydrolyzable radicals in a mixture of ethylsilane and tetra-functional silane to be hydrolyzed (and partially condensed) in the preparation of ethylsiloxanols which may be used in the practice of the invention are less readily hydrolyzable than halo radicals (e. g., ethoxy radicals in a mixture of ethyltriethoxysilane and ethyl orthosilicate), a carefully controlled hydrolysis reaction may be conducted, as hereinafter described, in a hydrolyzing solution of an inorganic acid in water, using a mutual solvent for the silanes and the hydrolyzing solution.

When the hydrolyzable radicals in the mixture of silanes to be hydrolyzed (and partially condensed) in the preparation of ethylsiloxanols which may be used in the practice of the invention are less readily hydrolyzable than halo radicals (e. g., ethoxy radicals in a mixture of ethyltriethoxysilane and ethyl orthosilicate), a carefully controlled hydrolysis reaction may be conducted, as hereinafter described, in a hydrolyzing solution of an inorganic acid in water, using a mutual solvent for the silanes and the hydrolyzing solution.

When the hydrolyzable radicals in the mixture of silanes to be hydrolyzed (and partially condensed) in the preparation of siloxanols which may be used in the practice of the invention are readily hydrolyzable radicals such as halo radicals (e. g., chloro radicals in a mixture of ethyltrichlorosilane and silicon tetrachloride) the hydrolyzing agent may be water alone, the hydrolysis being conducted in the presence of a suitable solvent for the silane, as hereinafter discussed.

The carefully controlled hydrolysis reaction by which ethylsiloxanols are obtained may be conducted by adding the mixture of ethylsilane and tetra-functional silane to the hydrolyzing solution at a rate sufficiently slow that the exothermic hydrolysis reaction does not cause local overheating (e. g., at such a rate that one mol of silanes is added in from about 10 to about 20 minutes). It is usually desirable that the hydrolyzing solution be stirred during the silane addition; otherwise, local overheating may result in spite of a slow rate of silane addition. It is often desirable to hydrolyze halosilanes with a water-ice slurry; the hydrolysis producing a hydrohalic acid which then serves as a catalyst for further hydrolysis. The mineral acids that are used as hydrolysis catalysts for less readily hydrolyzable radicals such as alkoxy and aroxy radicals include hydrochloric, sulfuric and phosphoric, hydrochloric usually being preferred. The amount of hydrolyzing solution that is used includes at least enough water to effect complete hydrolysis of the silanes (i. e., at least one gram mol of water for every two gram atoms of hydrolyzable radicals in the silanes to be hydrolyzed). When the mixture of silanes contains hydrolyzable radicals that are halo radicals, it is usually advantageous to use an excess of water, e. g., from 5 to 10 gram mols for every two gram atoms of hydrolyzable radicals, in order to dilute the hydrohalic acid that is formed, but it is ordinarily not advantageous to use more than about 20 gram mols of water for every two gram atoms of hydrolyzable radicals.

When a mixture of ethyltrichlorosilane and silicon tetrachloride is hydrolyzed in the production of an ethylsiloxanol having an r/Si ratio between about 0.6 and about 0.9, it is necessary to conduct the hydrolysis in the presence of certain solvents in order to avoid gelling of the products of the hydrolysis. Suitable solvents include any alcohol which is substantially insoluble in water but has some miscibility in water (e. g., 1-propanol, 1-butanol or a higher alcohol having up to eight carbon atoms, or mixtures thereof used in admixture with any aromatic hydrocarbon which is ordinarily employed as a solvent for silanes (e. g., benzene, toluene, or xylene) or mixtures thereof. In general, about equal parts by volume of the aromatic hydrocarbon (preferably toluene) and alcohol (preferably 1-butanol) are used, as shown in Figure I ("B"). Usually it is desirably initially to divide the aromatic hydrocarbon solvent equally between silane mixture and the hydrolyzing solution. It is believed that the partially miscible alcohol solvent avoids confining the hydrolysis of chlorine atoms attached to silicon atoms to an interphase (between water and a solvent insoluble in water), at which there is an insufficiency of water which results in the rapid formation of

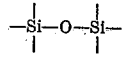

bonds and subsequent gelling. An aromatic hydrocarbon such as toluene acts as a diluent to prevent local high concentration of silicon tetrachloride and resultant gelation. (Toluene is insoluble in water and cannot be used alone without causing the reaction to take place at the interphase between the toluene and the water.) Higher ketones such as methylisobutylketone, methylisoamylketone, and amylethylketone, may also be used as solvents for the silanes without danger of gelling of the hydrolysis products. (A higher ketone is sufficiently miscible with water that it prevents the reaction from taking place at an interphase, but requires no diluent for the silanes since it does not react with the silanes as an alcohol does.)

A mutual solvent (i. e., a solvent for both the hydrolyzing solution and the silanes) which is used for the carefully controlled hydrolysis of a silane mixture containing less readily hydrolyzable radicals than halo radicals may be a lower ketone (e. g., acetone, methylethylketone or diethylketone) or a lower alcohol (e. g., ethanol, 1-propanol or 1-butanol).

It is usually desirable to use a substantial amount of a solvent or solvents for just the silanes (e. g., from about 100 to about 300 ml. of solvents per grams mol of silanes, or even more when the silane mixture is particularly easy to hydrolyze), although for silane mixtures that are hydrolyzable only with comparative difficulty (e. g., a mixture of ethyltriethoxysilane and ethyl orthosilicate), with which a mutual solvent is preferred, considerably less solvent may be used (e. g., approximately 70 ml. per gram mol of silanes).

It has been found that the hydrolysis is usually substantially complete within from about 5 to about 10 minutes after the addition of the silane to the hydrolyzing solution has been completed. Apparently, leaving the silane in contact with the hydrolyzing solution for longer periods of time has no deleterious effect on the resulting products. When a two-phase hydrolysis reaction has been conducted (i. e., using a solvent or mixture of solvents for the silanes, as, for example, in hydrolyzing a mixture of ethyltrichlorosilane and silicon tetrachloride), the silane layer is allowed merely to separate from the water layer (e. g., in a separatory funnel), and the water layer is drawn off. The separated organic solution of the hydrolysis products (i. e., siloxanols) is then washed with water and dried (e. g., over a drying agent such as anhydrous calcium chloride or anhydrous sodium sulfate). The drying agent is then removed (e. g., by filtration).

When the hydrolysis reaction is conducted with a mutual solvent and is considered to be approximately complete, the mixture of liquids is separated into two components (e. g., by solvent extraction using a solvent which is not miscible with water, such as diethyl ether). It is usually desirable then to extract the water layer again. In the hydrolysis of a mixture of ethyl orthosilicate and ethyltriethoxysilane, it is desirable to use only the amount of water theoretically required to hydrolyze all of the silanes so that a separation into two components is not necessary. The mixture, after addition to the hydrolyzing solution, is allowed to stand for at least twelve hours and preferably about twenty-four hours to permit completion of the hydrolysis (and partial condensation) reaction. The preparation of ethylsiloxanols by the hydrolysis of a mixture of ethyltriethoxysilane and ethyl orthosilicate is advantageous in that siloxanols of any desired r/Si ratio may be prepared without danger of gelation merely by mixing the desired amount of the silane reactants with water and a mutual solvent and allowing the mixture to stand for at least twelve hours before applying it in accordance with the present method. Since ethanol is formed during the hydrolysis, it is usually desirable to use ethanol as the mutual solvent, as shown in Figure I ("A").

The ethylsilanes used in the preparation of ethylsiloxanols may contain alpha-halo-substituted ethylsilanes in which the halogen has an atomic weight less than 80, e. g., alpha-chloroethyltrichlorosilane. However, such substituted silanes should comprise not more than about 20 mole per cent and preferably not more than about 10 mole per cent of the silanes to be hydrolyzed. The use of larger amounts of such silanes should be avoided in the preparation of a composition which may be applied as a water-repellent coating on a ceramic material since there is danger that such silanes may liberate HCl, which would, of course, be harmful to the ceramic material. (Beta-haloethylsilanes cannot be used, since under the hydrolysis conditions hereinbefore described they tend to decompose, with the splitting off of an olefin from the silane molecule.)

*Porous ceramic material*

The present method of waterproofing porous ceramic materials comprises applying a coat of a volatile solvent solution of an ethylsiloxanol (as hereinbefore defined) on the porous ceramic material and air-drying the material.

The term "ceramic materials" includes all products which are manufactured entirely or chiefly from raw materials of an earthy nature, as distinguished from those of a metallic or organic nature, and in whose manufacture a high-temperature treatment is involved. The present method of waterproofing is applicable to porous ceramic materials, the word "porous" being used herein to mean a material having sufficient porosity that upon standing in one-quarter inch of water at room temperature for 24 hours it absorbs more than 1 per cent of its weight in water. Thus, the term "porous" distinguishes ceramic materials to which the present method is applicable from glazed ceramic materials which may be classified as glass, pottery or enameled metals. Porous ceramic materials include: structural ceramics such as common brick, paving brick, face brick, sewer pipe, drain tile, hollow block, terra cotta, conduits, roofing tile, and flue lining; cements and plastics such as Portland cement, calcined gypsum products (i. e., molding and building plaster and stucco), and magnesia cement; and insulation products such as electrical insulators (porcelain spark plugs, etc.) and thermal insulators (diatomaceous earth brick). The present method is most applicable to masonry, i. e., to all artistic and architectural structures of such porous ceramic materials as stone, brick, tiles, artificial stone, adobe, etc., and to ceramic articles, particularly masonry units (i. e., bricks, pieces of stone, etc.), which in masonry are generally held together or made a single mass by mortar, plaster or earth. The porous ceramic materials should be dry when treated with a water-proofing composition by the present method.

*Method of waterproofing*

In accordance with the present method, a volatile solvent solution of an ethylsiloxanol may be applied to a porous ceramic material by spraying, brushing, dipping, or any other method by which the solution can be conveniently applied to coat the surface of the porous ceramic material. The volatile solvent serves the same function in a waterproofing composition used in the present method as the solvent in any resinous coating composition, i. e., it dilutes the composition so that it can be readily applied by spraying, brushing, dipping or any of the usual methods of application. In general, the amount of solvent should be sufficient to dilute the siloxanol solution to a concentration of from about 5 to about 35 per cent solids, and preferably from about 15 to about 25 per cent solids. It is usually impractical to use a solution of higher concentration, not only from the standpoint of economy, but also because a solution of high concentration may form a thick coating which may seal the pores of a ceramic material such as masonry and prevent "breathing" of the masonry. Evaporation of water from the surface, e. g., "breathing" or transpiration, is believed to be important in maintaining the integrity of ceramic materials, particularly masonry structures. For example, if through a break in the mortar water gets into a masonry structure whose pores are sealed, the structure may crack when the temperature drops below freezing, since the water cannot escape by evaporation through the pores at the surface of the masonry. A coating applied to a porous ceramic material in accordance with the present method does not seal the pores of the material but penetrates the pores to form a water-repellent coating therein, and thus does not prevent the free passage of water vapor through the material. Water in its liquid form, however, cannot readily penetrate the highly water-repellent coating. Thus, a ceramic article embodying the invention which has been rendered water-repellent in accordance with the present method is still porous and is capable of "breathing."

The fact that a water-repellent coating applied to a porous ceramic material in accordance with the present method penetrates the pores of the material has been demonstrated as follows: A common sand mold brick was coated on all six sides with a solution of the ethylsiloxanol whose preparation is hereinbefore described. The brick was broken in half, and immersed in a pan of water for a few hours with the uncoated broken surface down. Examination of the brick upon removal from the water showed that the entire cross-section of the brick except for a narrow (about ⅛ inch) margin around the cross-section of the brick was dark from the impregnation of water. The narrow margin around the cross-section of the brick was dry because the ethylsiloxanol solution had penetrated the pores of the brick and thus prevented the passage of liquid water into the coated pores.

In Figures II, III, IV and V the portion 4 of a porous ceramic material which contains only the amount of water vapor that is normally breathed from the atmosphere through the pores is indicated by the absence of dashed lines. A high concentration of liquid water is represented by more dense dashed lines 2 and a high concentration of vapor is represented by less dense dashed lines 3. Thus, Figure II shows that in an ordinary building foundation, a layer 2 of liquid water penetrates the portion that is adjacent a moisture source 1 (i. e., the earth) and that although this layer of liquid water diminishes gradually as the distance from the moisture source increases (some of it vaporizes through the pores that are not adjacent the moisture source) to form a surrounding layer 3 of highly concentrated water vapor, so much liquid water is able to penetrate the foundation that a layer of actual water 2 is retained in the interior of the foundation material.

On the other hand, as shown in Figure III, liquid moisture from the earth 1 cannot penetrate a foundation which has been treated with a water-repellent coating 5 in accordance with the present method. Although a light layer of highly concentrated water vapor 3 exists at the points of direct contact of the earth with the foundation, the water-repellent coating prevents penetration of liquid water into the foundation material. The foundation material treated in accordance with the present method is still porous so that the light vaporous layer 3 "breathes off" through the pores of the foundation material and is not retained in the material.

An important embodiment of the present invention is a porous ceramic article, particularly a masonry unit, which has been treated in accordance with the present method. As indicated in Figure I, the present method comprises applying a waterproofing composition (preferably prepared by the hydrolysis of either a mixture comprising ethyltrichlorosilane and silicon tetrachloride or a mixture comprising ethyltriethoxysilane and ethyl orthosilicate) to a masonry structure (e. g., a building), or to the masonry units themselves which are then dried. The advantages in the use of masonry units which have been rendered water repellent before they are used in masonry construction are readily apparent. For example, during the construction of masonry in hot, dry climates, it is ordinarily necessary to keep wetting the newly erected masonry in order to prevent the masonry units from drawing moisture from the mortar (such withdrawal of moisture would prevent the mortar from setting properly). The use of water-repellent masonry units embodying the invention eliminates the necessity for keeping the units wet, for the water from the mortar is no longer soaked up by the water-repellent masonry units, and the only loss of water is the small amount which evaporates at the edges of the mortar joints, this slight loss taking place so slowly as not to interfere with the setting of the mortar. As shown in Figure IV, water from a moisture source 1a (i. e., mortar) readily penetrates ordinary masonry units. The high concentration of liquid water 2 at the mortar joint diminishes gradually as the distance from the joint increases (some of it vaporized through the pores that are not adjacent the moisture source) to form a layer of highly concentrated water vapor, but some moisture impregnates nearly the whole masonry unit and is retained in the interior of the unit. On the other hand, as shown in Figure V, liquid moisture from mortar cannot penetrate masonry units which have been treated with a water-repellent coating 5 in accordance with the present method. No liquid water is soaked into the masonry units and the light layer of highly concentrated water vapor which forms at the mortar joints evaporates through the pores of the masonry and does not remain in the interior of the units.

The amount of a volatile solvent solution of an ethylsiloxanol required to form a water-repellent coating upon a porous ceramic material depends, of course, upon the porosity of the ceramic material and the severity of the weathering conditions to which the material is subjected. In general, the maximum required amount of a solution having a solids concentration within the ranges hereinbefore described is not more than about one gallon per 25 square feet of area and usually it is not more than one gallon per 75 to 100 square feet of area. In some cases as little as one gallon per 200 square feet may be highly effective, although usually it is preferable to apply not less than one gallon per 125 square feet. Such limitations are, of course, arbitrary and may be varied widely when the ceramic materials employed are relatively dense or extremely porous, the optimum amounts of waterproofing resin solution in such cases being best determined by experiment. In any event, the resin solutions employed in the present method have such good penetrating power that a single coat is sufficient to impart excellent water repellency. In contrast, aluminum stearate solutions which have been among the best waterproofing agents heretofore known, do not penetrate a porous ceramic material and are absorbed too slowly to be effective when applied in a single coat. That is, since an aluminum stearate solution does not penetrate the pores of a ceramic material, a single coat is soon worn off the material.

Furthermore, a coating of aluminum stearate cannot be applied to a porous ceramic material in cool weather, e. g., at temperatures below 50 degrees F., because a solution of aluminum stearate at lower temperatures tends to be so stiff and gel-like that it does not have even the slight penetrating power that it has when applied at higher temperatures.

The ethylsiloxanols which are used in the present method are air-drying. The term "air-drying" as used herein means capable of becoming dry to the touch within one week's exposure to atmospheric temperatures. Films of compositions which are dry to the touch only after longer exposure than one week at atmospheric temperatures are not considered to be air-drying, for such compositions do not actually air-dry, but become hard upon aging. The solvent in which ethylsiloxanols are used in waterproofing by the present method must, of course, be volatile at atmospheric temperatures in order that the water-repellent coatings applied to porous ceramic materials can air-dry. Although it is only necessary that the volatility of a solvent used in the present method be such that the solvent will evaporate within one week, ordinarily it is preferable that the solvent evaporate within about two days, and it is most desirable that the solvent evaporate more rapidly, e. g., within about twenty-four hours, so that an ethylsiloxanol used in such a solvent hardens in place before it has a chance, in its diluted, low viscosity state, to run down and thus form an uneven coating upon the ceramic material to which it is applied.

The volatile solvent solution of an ethylsiloxanol employed in the present method may contain a pigment (or pigments) suspended therein (i. e., the waterproofing solution may be a paint composition). Ordinarily such compositions are those in which the resin solids concentration is within the upper part of the ranges hereinbefore described and the proportion of pigment is approximately equal in weight to the proportion of resin solids in the volatile solvent solution. In th case of a waterproofing composition used in the present method which contains a pigment, the volatility of the solvent should be sufficiently great so as to prevent "flooding" of the pigment (i. e., a change in color at the surface of the paint film caused by a concentration at the surface of the paint film of one of the ingredients of the pigment portion).

All of the solvents hereinbefore described which may be used to obtain ethylsiloxanols that may be employed in the present method (i. e., ethylsiloxanols having the average unit structure hereinbefore described) are suitable solvents in which to apply the ethylsiloxanols in the waterproofing of porous ceramic materials. Thus, the ethylsiloxanol, as prepared, may have the proper concentration to be used directly in the present method, or may only require further dilution with the solvent (or mixture of solvents) in which it was prepared, or further concentration (e. g., by evaporation of part of the solvent) if too dilute upon preparation. If desired, however, the solvent (or mixture of solvents) in which the ethylsiloxanol is prepared may be removed and replaced with any solvent which is sufficiently volatile to be used in the present method. (For example, it is preferable to use ethanol as a solvent in the hydrolysis of a mixture of ethyltriethoxysilane and ethyl orthosilicate since ethanol is also obtained as a by-product from such a reaction. Because ethanol has such a low flash point, it may be desirable in the practice of the present method to recover the pure ethanol by vacuum distillation and substitute a less hazardous solvent in which to apply an ethylsiloxanol as a water-repellent coating.) Suitable volatile solvents, in addition to those hereinbefore described for use in the preparation of the ethylsiloxanols used in the present method, include, for example, ethers, such as diethyl, ethylpropyls, dipropyls and propylbutyls and cyclic ethers such as dioxane, and hydrocarbon solvents such as benzene, toluene, xylenes, hexanes, heptanes, and octanes. These solvents may not be desirable, however, for the ethylsiloxanols of low (e. g., less than 0.6) $r$/Si ratio (prepared by the hydrolysis of a mixture of ethyltriethoxysilane and ethyl orthosilicate), which tend to be somewhat unstable in non-polar solvents. Preferably such siloxanols are employed in the present method in a solvent in which they may be prepared (i. e., a lower alcohol or a lower ketone). Furthermore, it is preferable to employ any ethylsiloxanol used in the present method in a volatile solvent (or mixture of solvents) in which it may be prepared, since removal of the solvent (e. g., by distillation under vacuum) always involves danger of gelling the hydrolysis products during the distillation.

Air-drying of a volatile solvent solution of an ethylsiloxanol applied to a porous ceramic material in accordance with the present method leaves a water-repellent coating on the porous ceramic material. In general the coating is a continuous flexible film that prevents the ingress of any appreciable amount of water into the porous ceramic material. Furthermore, the flexibility of the film deposited in the crevices of the porous ceramic material (e. g., masonry units such as brick or stone) allows expansion and contraction of the material in hot and cold weather without cracking of the film. The ability of the resin solutions employed in the present method to penetrate porous ceramic materials results in water-repellent coatings that have greater permanency than any water-repellent coatings heretofore known. For example, wheres an aluminum stearate coating applied to a porous ceramic material which is subjected to certain weathering conditions might have to be replaced within two or three years in order to retain the maximum waterproofing effect (and probably would need to be applied in two coats, for reasons hereinbefore explained), a single coat of one of the resin solutions which may be employed in the present method applied to a similar porous ceramic material and subjected to similar weathering conditions would last at least two or three times as long as the aluminum stearate coating, for example five to eight years, and might be highly effective for a considerably longer period.

The present method of waterproofing porous ceramic materials may be carried out by applying to a porous ceramic material (e. g., a wall of unit masonry construction) a coat of a resin solution prepared by one of the procedures described in (a) through (g) below and permitting the resinous coating to air-dry:

(a) An ethylsilane (0.25 mol of ethyltriethoxysilane), a tetra-functional silane (0.25 mol of ethyl orthosilicate), a solvent (36.8 grams of "Shellacol") and an acidified hydrolyzing solution (13.9 ml. of a solution prepared by diluting 1 part by volume of 37 per cent hydrochloric acid with six parts by volume of water) are mixed and the mixture is allowed to stand at room temperature for twenty-four hours. (A sample of the resulting waterproofing resin solution when filmed on a glass plate dries at room temperature to a soft, clear crack-free film.)

(b) A waterproofing resin solution is prepared by the procedure described in (a) using the following proportions of the ingredients: 0.3 mol of ethyltriethoxysilane; 0.2 mol of ethyl orthosilicate; 29.3 grams of "Shellacol" and 13.8 ml. of the acidified hydrolyzing solution.

(c) A water-proofing resin solution is prepared by the procedure described in (a) using the following proportions of the ingredients: 0.35 mol of ethyltriethoxysilane; 0.15 mol of ethyl orthosilicate; 29.7 grams of "Shellacol" and 13.9 ml. of the acidified hydrolyzing solution.

(d) A waterproofing resin solution is prepared by the procedure described in (a) using the following proportions of the ingredients: 0.4 mol of ethyltriethoxysilane; 0.1 mol of ethyl orthosilicate; 30.1 grams of "Shellacol" and 13.4 ml. of the acidified hydrolyzing solution.

(e) A waterproofing resin solution is prepared by the procedure described in (a) using the following ingredients: ethyltriethoxysilane (0.225 mol), diethyldiethoxysilane (0.025 mol), ethyl orthosilicate (0.25 mol), a solvent (39.5 grams of "Shellacol") and an acidified hydrolyzing solution (12.7 grams of a solution prepared by diluting 1 part by volume of 37 per cent hydrochloric acid with six parts by volume of water).

(f) A waterproofing resin solution is prepared by the procedure described in (a) using the following ingredients: diethyldiethoxysilane (17.6 grams), ethyl orthosilicate (20.8 grams), ethanol (15 ml.) and an acidified hydrolyzing solution (5.4 ml. of a solution prepared by diluting 1 part by volume of 37 per cent hydrochloric acid with six parts by volume of water).

(g) A waterproofing paint composition is prepared by the following procedure: A mixture of ethyltriethoxysilane (19.2 grams), ethyl orthosilicate (20.8 grams), denatured ethanol (15 ml.) and an acidified hydrolyzing solution (6.5 ml. of a solution prepared by diluting 1 part by volume of 37 per cent hydrochloric acid with six parts by volume of water) is allowed to stand for two hours. The resulting solution is then mixed with sufficient titanium dioxide pigment to form a composition having a consistency suitable for application by brushing. (A sample of the paint composition when filmed on a glass plate dries at room temperature within ten minutes to a continuous, crack-free film.)

We claim:

1. A method of waterproofing porous unglazed ceramic materials that comprises applying thereto a volatile solvent solution containing from about 5 to about 35 per cent by weight of an ethylsiloxanol having an overall ratio of non-hydrolyzable groups to silicon atoms of 0.3 to 1, in which 30 to 100% of the silicon atoms have a single ethyl group attached thereto as the sole non-hydrolyzable substituent, in which no substantial number of silicon atoms have non-hydrolyzable substituents other than such single ethyl groups, and in which substantially all the remaining silicon atoms have no non-hydrolyzable substituents attached thereto, said solution being applied to said ceramic material in amounts not more than one gallon per 25 square feet nor less than one gallon per 200 square feet of their surface, and air-drying.

2. A method of waterproofing porous unglazed ceramic materials that comprises forming a water-repellent coating thereon by applying a volatile solvent solution containing from 15 to 25 per cent by weight of an ethylsiloxanol in which the overall ratio of non-hydrolyzable groups to silicon atoms is 0.5 to 0.8, in which not less than 50% nor more than 80% of the silicon atoms have a single ethyl group only attached thereto, in which no substantial number of silicon atoms have non-hydrolyzable groups other than ethyl attached thereto, and in which substantially all the remaining silicon atoms have no non-hydrolyzable groups attached thereto, said solution being applied to said ceramic materials in amounts not more than one gallon per 25 square feet nor less than one gallon per 100 square feet of area.

3. A porous unglazed ceramic article having at least one exposed surface thereof impregnated with an ethylsiloxanol in which the overall ratio of non-hydrolyzable groups to silicon atoms is 0.3 to 1, in which from 30 to 100% of the silicon atoms have a single ethyl group attached thereto as the sole non-hydrolyzable substituent, in which no substantial number of silicon atoms have non-hydrolyzable substituents other than such single ethyl groups, and in which all the remaining silicon atoms have no non-hydrolyzable substituents attached thereto, said ethylsiloxanol being present in an air-dried condition and in an amount such as are derived by applying to said surface from not more than one gallon per 25 square feet nor less than one gallon per 100 square feet of a volatile solvent solution containing from about 5 to about 35 per cent by weight of said ethylsiloxanol.

4. An article as claimed in claim 3 that is a masonry unit.

5. A water-repellent article of porous ceramic material having at least one exposed surface impregnated with an ethylsiloxanol comprising the dried product of the hydrolysis, in intimate contact with a water-insoluble solvent for the hydrolysis product, of a mixture consisting of 50 to 80 mol per cent of ethyltrichlorosilane and 20 to 50 mol per cent of silicon tetrachloride, the air-dried ethylsiloxanol being present in amount ranging from 25 to 100 square feet per gallon of a solution containing 5 to 35% of said ethylsiloxanol.

References Cited in the file of this patent

UNITED STATES PATENTS

| | | |
|---|---|---|
| 2,258,220 | Rochow | Oct. 7, 1941 |
| 2,507,200 | Elliott et al. | May 9, 1950 |
| 2,521,674 | Britton | Sept. 12, 1950 |
| 2,574,168 | Brick | Nov. 6, 1951 |

FOREIGN PATENTS

| | | |
|---|---|---|
| 290,717 | Great Britain | May 16, 1928 |